Oct. 19, 1948. B. L. HULSEBUS 2,451,952
WEED EXTRACTOR
Filed April 23, 1945
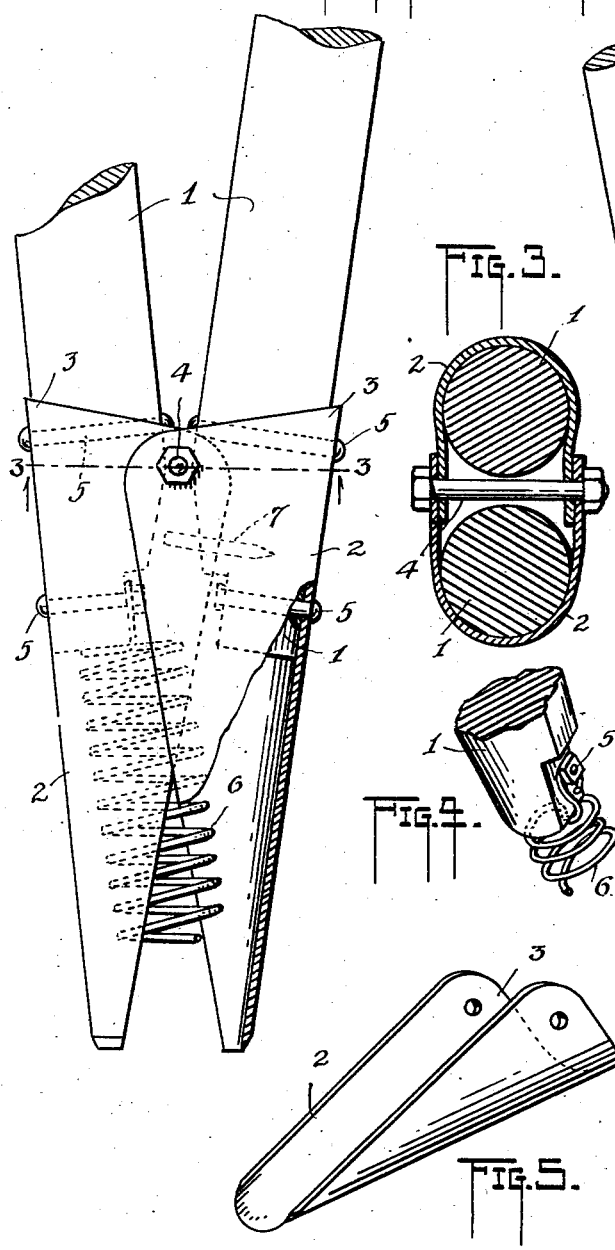
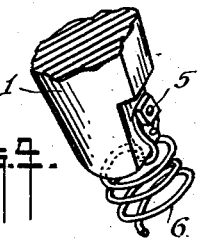
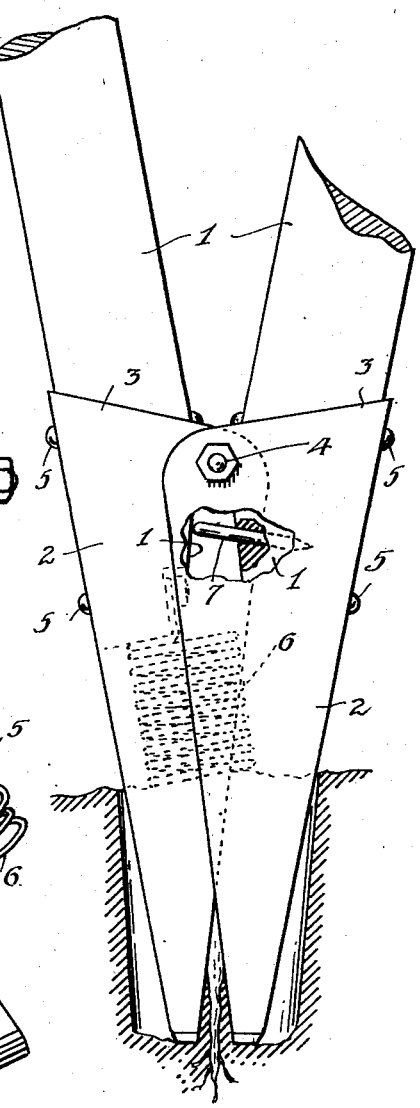
Inventor
B. L. Hulsebus,
By
Attorney Patented Oct. 19, 1948

2,451,952

UNITED STATES PATENT OFFICE 2,451,952

WEED EXTRACTOR

Bernhard L. Hulsebus, Pasadena, Calif., assignor to Everett B. Hulsebus, Peoria, Ill.

Application April 23, 1945, Serial No. 589,842

1 Claim. (Cl. 294—50.8)

This invention pertains to a tool for extracting weeds, particularly weeds or plants of that type having long tap roots such, for example, as the dandelion, said tool, however, being also of use for other purposes as will appear.

An object of the invention is to provide a tool for the purpose named having two handles pivotally related, each having thereon at its working end a blade, the blades being opposed to each other and so formed as to provide an enclosure by which a dirt-wad and the plant to be extracted may be lifted from the ground.

A further object is to provide a tool of the type named including in its construction means for automatically ejecting a dirt-wad from between the blades, all of which will be understood herein together with other advantages.

In order that the implement may be thoroughly understood in all its details the accompanying drawing is provided forming part hereof, wherein—

Figure 1 is a side elevation of the tool showing two companion blades partially separated and each carried by a handle portion, part of one blade being broken away.

Figure 2 is a similar view with parts broken away to illustrate certain structures.

Figure 3 is a cross section of the tool produced on lines 3—3 of Figure 1.

Figure 4 shows in perspective part of one of the operating handles and a manner of securing thereto an ejecting-spring, and Figure 5 illustrates, also in perspective, one of the blades of the tool.

In Figures 1 and 2 the character 1 denotes two operating handles which may be of any convenient length, these having secured to one end of each a blade 2. In this instance the blades are constructed of sheet metal bent into substantially semicircular form lengthwise. As thus formed it is noted that at one of their extremities the blades are broad as at 3, and that the two edges of one of them overlie the edges of the companion blade, the concave sides facing each other. A bolt 4 serves as a pivot for the extremities 3 of the blades, the latter being fitted upon the handles 1 and secured by any suitable means such, as by bolts or rivets 5. From their broad extremities the blades taper toward their working ends and terminate in points that may be readily forced into the ground.

Employed in the present instance is a spring 6 of a coiled expanding type. This, as shown in broken lines in Figure 1, and also in Figure 4 in continuous lines, may be secured at one end by one of the named bolts or rivets 5 in such position and manner that at one end it may abut the end of a handle, its free end extending between the blades toward their pointed ends.

In using the tool the act of moving the handles 1 toward each other naturally spreads the blades to the required or desired extent for the work to be performed, whereupon said blades are forced into the ground to close the plant to be worked upon. Such a spread of the blades, for example, is shown in Figure 1. Figure 2 shows that the handles have been spread still farther whereby to close the blades upon the ground portion containing the plant to be extracted. Due to the overlapping of the blade edges the spreading movement of the handles causes the blades to shear the dirt at opposite sides of the dirt-wad to be lifted, the latter being thus readily lifted from the soil together with the weed or plant held therein.

As has been heretofore stated certain weeds, such as a dandelion, have long tap roots. In order that such a root shall not be severed, but removed bodily with the plant, the blades 2 should be prevented closing together at their points. For the purpose of preventing closing of the blades any means may be used. For example, in Figures 1 and 2 a stop member such as a pin 7, or equivalent part, may be fixed in one of the handles to abut the companion handle for preventing the two blades from severing a root growth. In this connection even the handle ends within the blades may be fashioned to abut each other as the limiting means.

The blades due to their forms, i. e., their U forms, provide an enclosing space between them, that space being partially conical when said blades are closed upon the dirt-wad so that the plant as a whole can be bodily lifted free of the ground, following, of course, the shearing action mentioned.

In forcing the tool into the ground the spring 6 in meeting the ground surface will be compressed and will maintain pressure on the said dirt-wad until the blades are spread, whereupon said wad will be ejected.

Although the term "semicircular" has been used in respect to the form of the blades it is to be understood any other form having a cavity may perhaps be used so long as the demands of such a tool are satisfied.

While the tool is adapted for extracting weed growths or plants it may be employed for "setting out" plants by placing the plant to be set between the blades for deposit in a prepared excavation.

The tool illustrated is a preferred form but changes may be made without departing from the spirit of the invention.

I claim:

A tool of the character described including in its construction two pivotally connected handle portions, a U-shaped blade fashioned to fit each handle portion, and affixed thereto, the longitudinal edges of the two blades adapted to lap one on the other to jointly provide shearing action, a stop member carried by one of the handle portions, an abutment provided by and at the other handle portion, the stop and abutment adapted to limit the closing movement of the blades to prevent the points of the blades closing on each other for providing a space between said points in lifting a plant unharmed, an abutment lying close to one of the blades providing a space between it and the opposite blade, and a mounted spring bearing at one end upon the last named abutment and spaced from said opposite blade to provide a pasageway for materials between it and the latter, said spring at its other end adapted to engage upon the ground surface when the points of the blades are in the ground at the plant to be lifted.

BERNHARD L. HULSEBUS.

REFERENCES CITED

The following references are of record in the file of this patent:

UNITED STATES PATENTS

| Number | Name | Date |
|---|---|---|
| 429,328 | Webb | June 3, 1890 |
| 467,751 | Hall et al. | Jan. 26, 1892 |
| 815,133 | Walker et al. | Mar. 13, 1906 |
| 973,188 | Francisco | Oct. 18, 1910 |
| 1,407,232 | Stevens | Feb. 21, 1922 |

FOREIGN PATENTS

| Number | Country | Date |
|---|---|---|
| 56,526 | Switzerland | July 12, 1911 |